United States Patent
Hauser

(10) Patent No.: US 8,011,458 B2
(45) Date of Patent: Sep. 6, 2011

(54) STEERING AND DRIVING SYSTEMS AND RELATED VEHICLES

(75) Inventor: Hans Hauser, Strongsville, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 11/269,899

(22) Filed: Nov. 8, 2005

(65) Prior Publication Data

US 2006/0185910 A1    Aug. 24, 2006

Related U.S. Application Data

(63) Continuation of application No. 10/245,158, filed on Sep. 11, 2002, now Pat. No. 6,962,219.

(60) Provisional application No. 60/322,943, filed on Sep. 17, 2001.

(51) Int. Cl.
*B62D 6/00* (2006.01)
*B62D 11/02* (2006.01)

(52) U.S. Cl. .............. 180/6.32; 180/6.34; 180/6.48; 180/6.66

(58) Field of Classification Search .............. 180/6.58, 180/6.6, 6.66, 6.2, 6.24, 6.26, 6.32, 6.34, 180/6.48

See application file for complete search history.

(56) References Cited

U.S. PATENT DOCUMENTS

| | | | |
|---|---|---|---|
| 3,362,493 A | 1/1968 | Davis et al. | 180/6.32 |
| 3,398,819 A | 8/1968 | Ruhl et al. | 192/221 |
| 3,429,392 A | 2/1969 | Ryskamp | 180/6.3 |
| 3,572,033 A | 3/1971 | Tolley | 60/427 |
| 3,900,075 A | 8/1975 | Chichester et al. | 180/6.3 |
| 3,913,695 A | 10/1975 | Holdenried et al. | 180/6.48 |
| 4,339,966 A | 7/1982 | Kraus | 74/650 |
| 4,399,882 A | 8/1983 | O'Neill et al. | 180/6.48 |
| 4,572,310 A | 2/1986 | Peter | 180/6.24 |
| 4,875,536 A * | 10/1989 | Saur et al. | 180/6.32 |
| 4,882,947 A | 11/1989 | Barnard | 475/23 |
| 4,969,533 A | 11/1990 | Holm et al. | 180/273 |
| 5,042,238 A | 8/1991 | White, III et al. | 56/11.8 |
| 5,078,222 A | 1/1992 | Hauser | 180/638 |
| RE34,057 E * | 9/1992 | Middlesworth | 180/6.2 |

(Continued)

FOREIGN PATENT DOCUMENTS

EP    0 754 613    1/1997

(Continued)

OTHER PUBLICATIONS

"SST15, SST16, and SST18 Spin-Steer Technology™ lawn tractors," Litho in U.S.A., Apr. 2003.

(Continued)

*Primary Examiner* — Paul N Dickson
*Assistant Examiner* — Marc A Scharich
(74) *Attorney, Agent, or Firm* — Fulbright & Jaworski L.L.P.

(57) ABSTRACT

A ZTR vehicle includes true or proper ZTR steering in the forward and reverse directions. The vehicle has independently driven locomotive drives that drive the wheels to provide mobility and steering to the vehicle. A steering wheel is included that pivots one of two steering input members that rotate to independently shift the drive units. A speed and direction pedal is also included, which is communicated to provide direction and magnitude input to the drive units. The steering input and speed and direction inputs coordinate propelling the vehicle such the vehicle turns in the same direction when traveling forward as well as in reverse.

16 Claims, 11 Drawing Sheets

U.S. PATENT DOCUMENTS

| | | | |
|---|---|---|---|
| 5,238,267 A | 8/1993 | Hutchison et al. | 280/781 |
| 5,263,901 A | 11/1993 | Kawakami et al. | 180/6.48 |
| 5,288,091 A | 2/1994 | Deschamps | 180/309 |
| 5,529,135 A | 6/1996 | Wenzel et al. | 180/6.24 |
| 5,766,105 A | 6/1998 | Fellows et al. | 474/18 |
| 5,941,334 A | 8/1999 | Inagaki | 180/242 |
| 6,092,617 A | 7/2000 | White, III et al. | 180/338 |
| 6,129,164 A * | 10/2000 | Teal et al. | 180/6.2 |
| 6,152,248 A | 11/2000 | Hidaka et al. | 180/6.38 |
| 6,196,342 B1 * | 3/2001 | Teal et al. | 180/6.2 |
| 6,230,829 B1 | 5/2001 | Martin et al. | 180/6.3 |
| 6,256,357 B1 | 7/2001 | Oshima | 375/261 |
| 6,257,357 B1 | 7/2001 | Teal et al. | 180/6.2 |
| 6,301,864 B1 | 10/2001 | Damie et al. | 56/11.3 |
| 6,408,960 B1 | 6/2002 | Hidaka et al. | 180/6.38 |
| 6,434,919 B2 | 8/2002 | Schick | 56/15.9 |
| 6,447,419 B1 | 9/2002 | Irikura et al. | 475/24 |
| 6,456,925 B1 | 9/2002 | Romig | 701/93 |
| 6,540,633 B1 | 4/2003 | Hasegawa et al. | 475/24 |
| 6,554,085 B2 | 4/2003 | Hasegawa et al. | 180/6.26 |
| 6,601,663 B2 * | 8/2003 | Hauser | 180/6.3 |
| 6,672,411 B1 | 1/2004 | Mouser | 180/6.32 |
| 6,688,090 B2 | 2/2004 | Velke et al. | 56/14.7 |
| 6,725,954 B1 * | 4/2004 | Keane et al. | 180/6.48 |
| 6,729,115 B2 | 5/2004 | Bartel | 56/11.3 |
| 6,771,034 B2 | 8/2004 | Reile et al. | 318/139 |
| 6,808,032 B2 * | 10/2004 | Wuertz et al. | 180/6.48 |
| 6,874,305 B2 | 4/2005 | Ishimori | 56/10.8 |
| 6,904,985 B2 | 6/2005 | Ferree et al. | 180/6.32 |
| 6,905,985 B1 | 6/2005 | Schindzielorz et al. | 442/65 |
| 6,912,831 B2 | 7/2005 | Velke et al. | 56/10.9 |
| 6,921,109 B2 | 7/2005 | Hutchison et al. | 280/771 |
| 6,951,259 B2 | 10/2005 | Irikura | 180/6.3 |
| 6,962,219 B2 | 11/2005 | Hauser | 180/6.34 |
| 7,108,096 B1 | 9/2006 | Oxley et al. | 180/197 |
| 7,237,629 B1 | 7/2007 | Bland et al. | 180/6.24 |
| 7,347,434 B2 | 3/2008 | Lewis et al. | 280/99 |
| 2002/0092685 A1 | 7/2002 | Hauser | 180/6.3 |
| 2002/0108800 A1 | 8/2002 | Irikura et al. | 180/307 |
| 2003/0019682 A1 | 1/2003 | Schaedler et al. | 180/308 |
| 2003/0102171 A1 | 6/2003 | Hauser | 180/6.2 |
| 2003/0106725 A1 | 6/2003 | Irikura | 180/6.26 |
| 2003/0213625 A1 | 11/2003 | Okada et al. | 180/6.2 |
| 2004/0245029 A1 | 12/2004 | Irikura | 180/6.24 |
| 2005/0003919 A1 | 1/2005 | Hasegawa et al. | 475/83 |
| 2005/0023049 A1 | 2/2005 | Ferree et al. | 180/6.3 |

FOREIGN PATENT DOCUMENTS

| | | |
|---|---|---|
| EP | 1 000 793 | 5/2000 |
| EP | 1 186 459 | 3/2002 |
| GB | 2015666 | 9/1979 |
| GB | 2119328 | 9/1979 |
| GB | 2303829 | 3/1997 |
| WO | WO 03/100295 | 12/2003 |

OTHER PUBLICATIONS

Hidaka, "Development of forced differential steering control system," *Automation Technology for Off-Road Equipment, Proceeding of the Oct. 7-8, 2001 Conference, Kyoto, Japan*, Oct. 7, 2004.

Office Communication issued in U.S. Appl. No. 11/490,881, dated Mar. 13, 2009.

Response to Office Communication issued in U.S. Appl. No. 11/490,881, submitted Apr. 13, 2009.

Office Communication issued in U.S. Appl. No. 11/490,881, dated Jul. 2, 2009.

European Office Communication issued in U.S. Appl. No. 06 792 907.5-1264, dated Feb. 2, 2009.

European Office Communication issued in U.S. Appl. No. 06 792 905.9-1264, dated Mar. 13, 2009.

Office Action, in U.S. Appl. No. 11/490,881, mailed Feb. 19, 2010.

Response to Office Action, in European App. No. 06792907.5, dated Aug. 27, 2009.

Response to Office Action, in European App. No. 06792905.9, dated Oct. 30, 2009.

New Zealand Examination Report, issued in Int. App. No. 566486, mailed Sep. 29, 2009.

Response to Jul. 2, 2009 Office Action, submitted in U.S. Appl. No. 11/490,881, dated Sep. 24, 2009.

Supplementary European Search Report, issued in Int. App. No. EP 06 78 8098, mailed Jul. 14, 2009.

New Zealand Examination Report, issued in Int. App. No. 566485, mailed Sep. 24, 2009.

Office Action, issued in European App. No. 06788098.9, mailed Oct. 12, 2009.

International Search Report and Written Opinion, issued in Application No. PCT/US2009/038404, mailed Jan. 8, 2010.

Office Communication, issued in European Patent Application No. 06792905.9, dated Jul. 28, 2010.

Office Communication, issued in U.S. Appl. No. 12/097,875, dated Dec. 13, 2010.

Office Communication, issued in U.S. Appl. No. 11/490,881, dated Oct. 27, 2010.

Office Communication, issued in U.S. Appl. No. 11/268,899, dated Jun. 15, 2010.

Response to office communication, submitted in European Patent Application No. 06788098.9, submitted Jul. 30, 2010.

Notice of Allowance issued in U.S. Appl. No. 11/490,881, dated Apr. 5, 2011.

\* cited by examiner

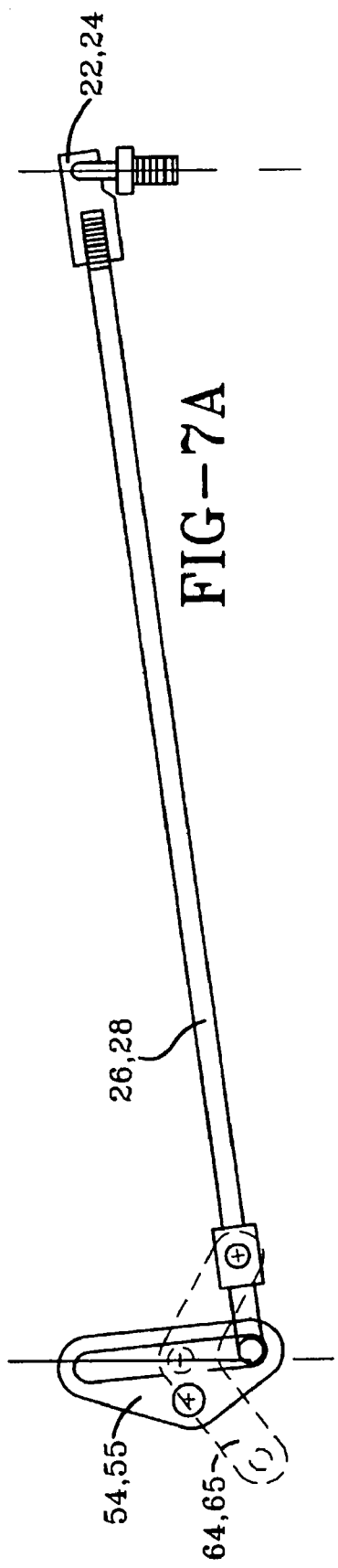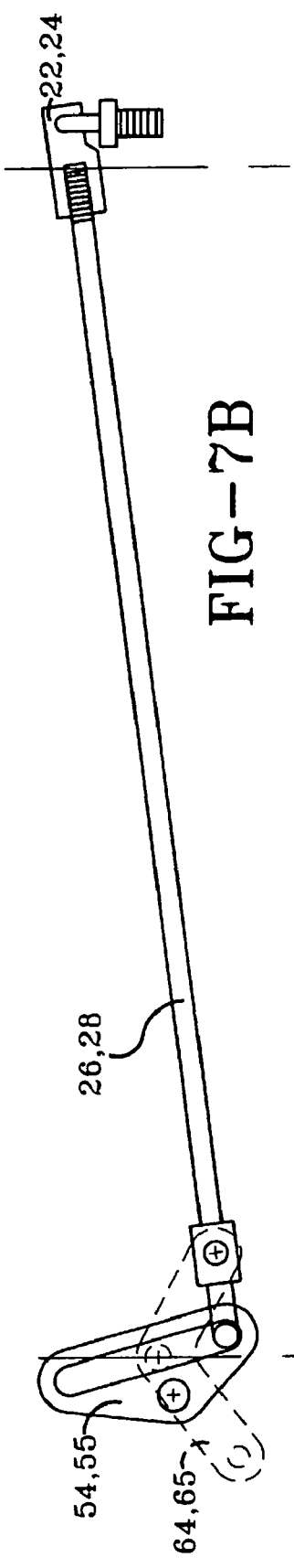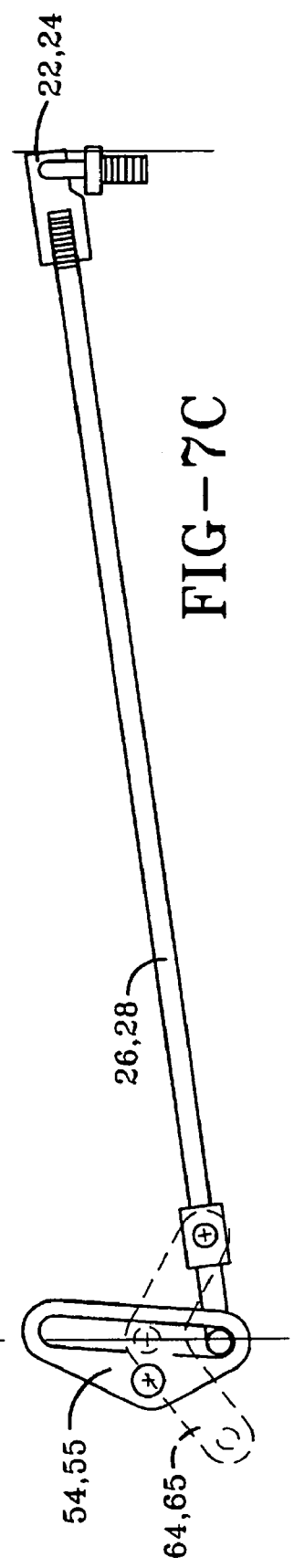

STEERING AND DRIVING SYSTEMS AND RELATED VEHICLES

CROSS-REFERENCE TO RELATED APPLICATION(S)

The present application is a continuation of U.S. patent application Ser. No. 10/245,158 filed Sep. 11, 2002, now U.S. Pat. No. 6,962,219, which claims priority to U.S. Provisional Application Ser. No. 60/322,943, filed on Sep. 17, 2001. U.S. patent application Ser. No. 10/245,158 is incorporated by reference.

BACKGROUND OF THE INVENTION

A. Field of Invention

The present invention relates to the art of Zero Turn Radius vehicles and more specifically to Zero Turn Radius mowers incorporating mechanical steering systems.

B. Description of the Related Art

Zero Turn Radius (ZTR) vehicles including mowers work well for their intended purpose. One advantage of ZTR vehicles is that they are capable of making very tight (zero radius) turns. One disadvantage of most ZTR vehicles is that their operation is not intuitive for most operators because steering of the vehicles is accomplished by steering levers, rather than a steering wheel. Recently, steering wheels have been incorporated onto ZTR vehicles. However, known ZTR vehicles using a steering wheel steer the vehicle differently in the forward direction of travel than in reverse. That is to say, that with the steering wheel steered to turn the vehicle right, and upon depressing the accelerator, the vehicle will make a forward right turn. But, when the accelerator is depressed to drive the vehicle in reverse, the vehicle makes a rearward left turn, rather than a rearward right turn. What is needed is a reliable mechanical ZTR steering system that steers the vehicle consistently in the direction that the steering wheel is turned in forward as well as the reverse directions.

Other objects and advantages of the invention will appear from the following detailed description of the preferred embodiment of the invention with reference being made to the accompanying drawings.

BRIEF SUMMARY

The present invention includes a ZTR vehicle that provides for proper steering of the ZTR vehicle in the forward and reverse directions.

Another aspect of the present invention includes a ZTR vehicle having a steering wheel that controls the steering of the vehicle.

Yet another aspect of the present invention includes hydrostatic drives that drive each respective rear ground engaging wheel independently from the other.

Still another aspect of the present invention includes an asynchronously actuated set of two steering input members that engage the hydrostatic drives.

Still yet another aspect of the present invention includes a speed and direction input member that maneuvers pintle links of the hydrostatic drive substantially in unison.

A ZTR vehicle is provided that steers the same in the forward and reverse directions. The vehicle includes a steering wheel operatively connected to independently steer two (2) drive control members. The drive control members provide input to two (2) locomotive drive units that propel and steer the vehicle. An accelerator pedal or speed input device is rotatably disposed about the vehicle to provide speed and direction input to drive the vehicle. The accelerator pedal is connected to a rotating shaft that pivots two (2) speed input members. The steering wheel provides steering input to two (2) steering input members. The steering input members each have sleeves that slide longitudinally about the drive control members to provide independent shifting of the drive control members in the forward and reverse directions.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 7a is a schematic side view of the ZTR control assembly with the steering wheel fully turned and no speed input.

FIG. 7b is a schematic side view of the ZTR control assembly with the steering wheel fully turned and speed input actuated to drive the vehicle in forward direction resulting in a forward ZTR turn.

FIG. 7c is a schematic side view of the ZTR control assembly with the steering wheel fully tuned and speed input actuated to drive the vehicle in reverse direction resulting in a reverse ZTR turn.

DESCRIPTION OF THE PREFERRED EMBODIMENT

Figure 1:
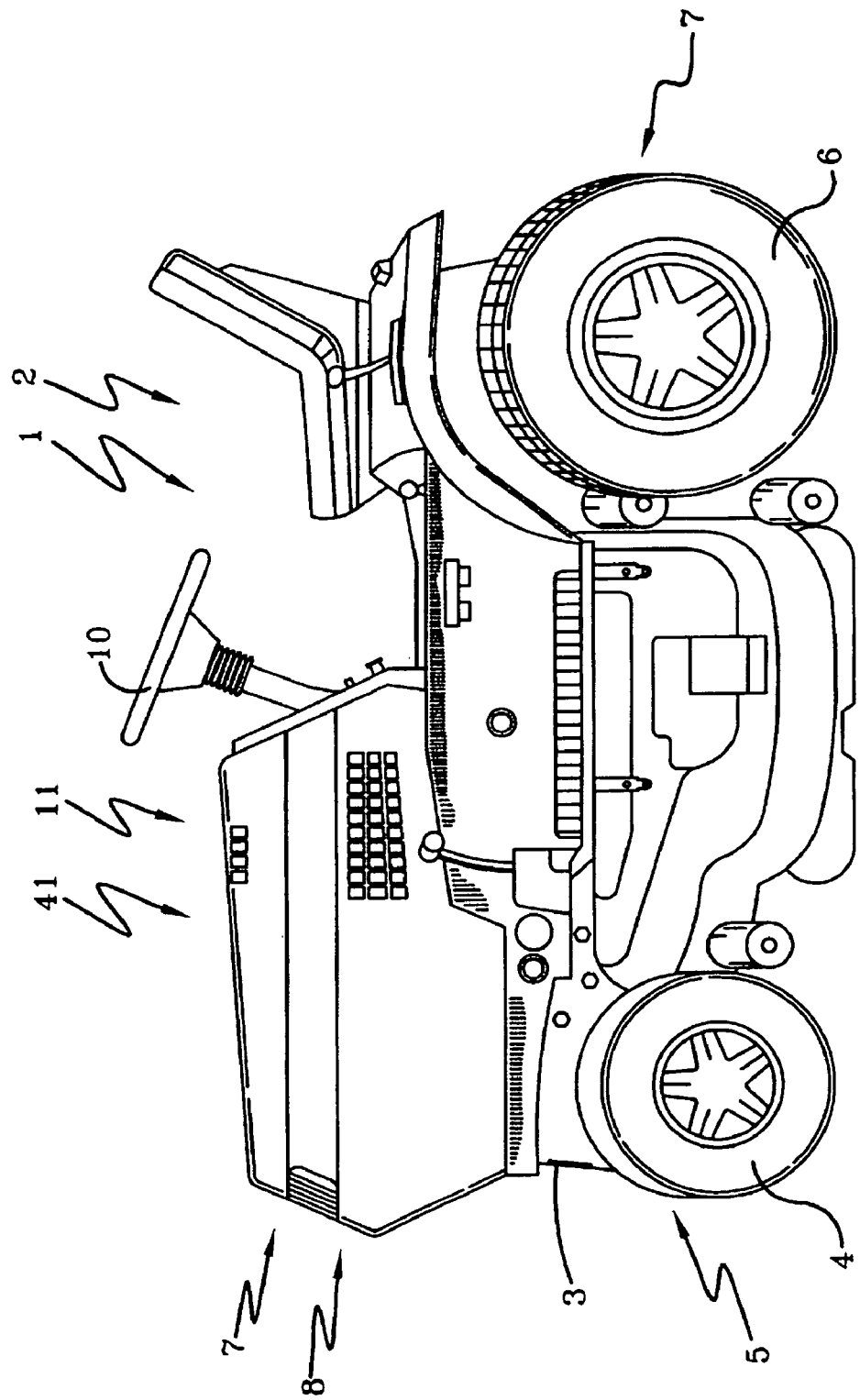
FIG. 1 is a side view of a ZTR vehicle.

Referring now to the drawings wherein the showings are for purposes of illustrating a preferred embodiment of the invention only and not for purposes of limiting the same, FIG. 1 depicts a ZTR vehicle 1. The ZTR vehicle 1 includes a frame 3 supporting two rotatably-mounted front ground engaging wheels 4, 5 and two rotatably-mounted rear ground engaging wheels 6, 7. The rear ground engaging wheels 6, 7 provide steering and mobility to maneuver the vehicle 1 as desired.

The vehicle 1 may include an engine, which may be an internal combustion engine 8. However, any type of engine may be chosen with sound engineering judgment that provides power to operate the vehicle 1. The vehicle 1 may also include a steering wheel 10 that is operatively connected to steer the vehicle 1 as will be discussed in greater detail in a subsequent paragraph. A speed control member 11 may be rotatably attached to the vehicle 1, which is operable to provide variable speed control input in first and second directions, as will be discussed subsequently. Additionally, the ZTR vehicle 1 may include a mower deck 13 wherein the ZTR vehicle 1 is a ZTR mower 2.

Figure 2:
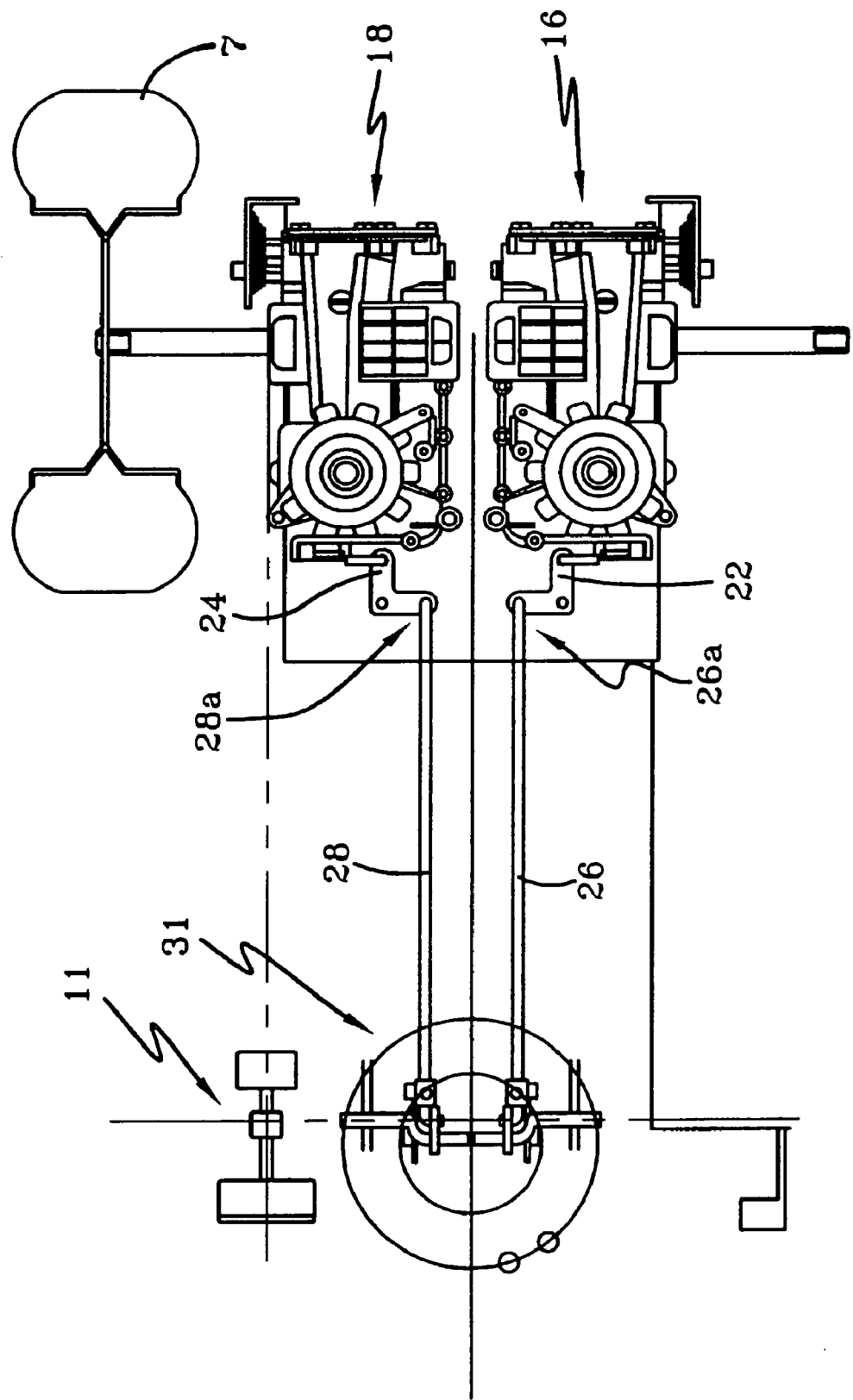
FIG. 2 is a partial cutaway view of the power train of the ZTR vehicle, including Hydrostatic Drives.

With reference now to FIG. 2, a pair of locomotive drive units, 16, 18 are shown operatively connected to drive rear ground engaging wheels 6, 7 respectively. In the preferred embodiment, the drive units 16, 18 are hydrostatic drives (HDs) but it is to be understood that other drive units are also contemplated, such electric and mechanical drive units. The drive units 16, 18 are used to independently drive the rear wheels 6, 7 as is well known for ZTR vehicles and which will not be discussed further. The hydrostatic drives 16, 18 may include pivotally attached pintle links 22, 24 that when pivoted in first and second directions control power that drives the respective wheels in first and second directions. The more that the pintle links 22, 24 are pivoted, the greater the magnitude of speed that the locomotive drives 16, 18 are driven in each respective direction. First ends 26*a*, 28*a* of input shafts 26, 28 may be connected to the pintle links 22, 24 respectively and may translate tension and compression forces for use in pivoting the pintle links 22, 24 in the first and second directions. It is noted that the input shafts 26, 28 may be independently shifted with respect to the other. By "shifted" it is meant that the input shafts 26, 28 may be separately longitudinally moved whereby the pintle links 22, 24 are pivoted respectively. Additionally, the input shafts 26, 28 may be pivotally attached at the first ends 26*a*, 28*a* to the pintle links 22, 24 in such a manner so as to allow for pivotal movement of the input shafts 26, 28 with respect to the pintle links 22, 24. In other words, the first ends 26*a*, 28*a* of the input shafts 26, 28 may be pivoted with respect to the pintle links 22, 24.

Figure 3:
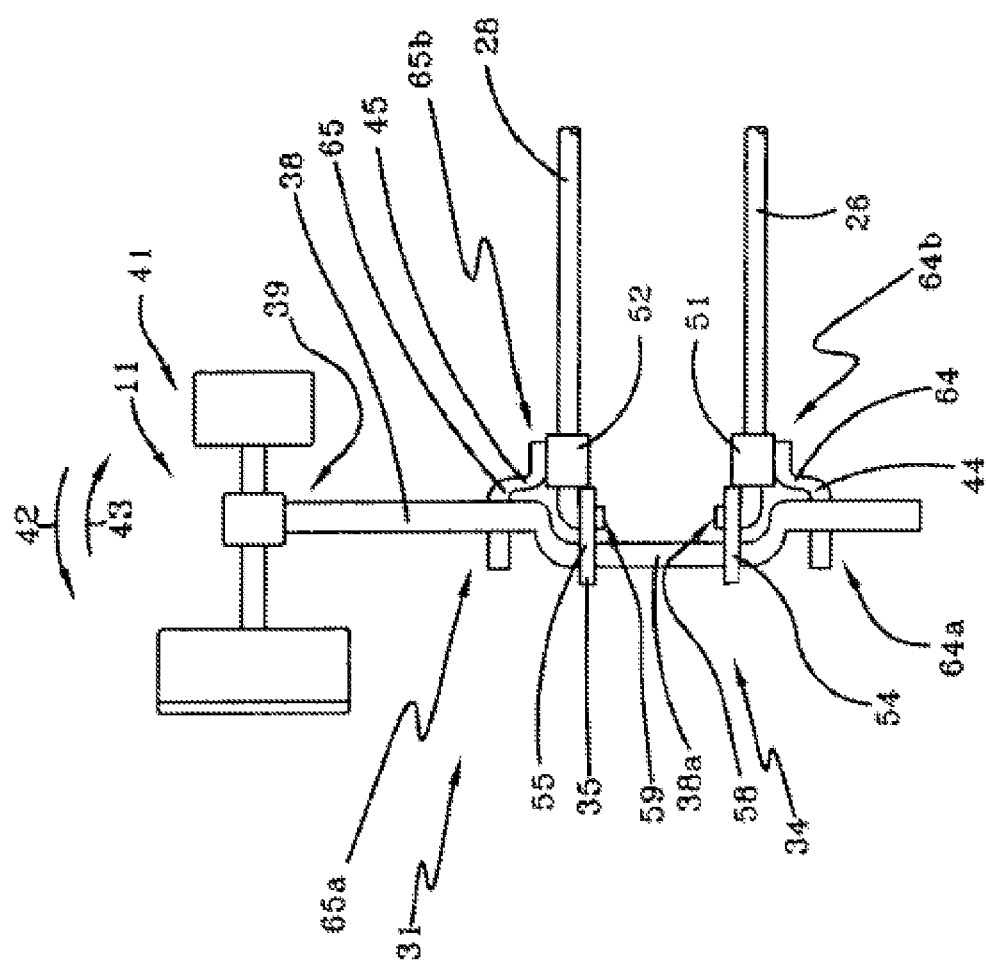
FIG. 3 is a top view of the mechanical ZTR control linkage.

With reference now to FIGS. 2 and 3, a ZTR control assembly is shown generally at 31. The ZTR control assembly 31 includes a linkage, which in the preferred embodiment may be mechanical members, interconnected to receive steering input from the steering wheel 10 and speed control input from the speed control member 11 for use together in providing control to shift the input shafts 26, 28. The speed control member 11 may be a foot pedal or hand lever for controlling the magnitude and direction of the speed input by pivoting the member 11. It is noted that any member may be used to provide speed input as chosen with sound engineering judgment. The steering wheel 10 may also be exchanged with other steering members as is appropriate for use with the present invention. The linkage 31 is configured to steer the vehicle the same in the forward as in the reverse direction. In other words, the ZTR control linkage 31 is interconnected to the steering wheel 10 and the speed control member 11 to provide proper steering in the reverse and forward directions of travel. That is to say that when the vehicle is being driven in a first, or forward, direction and when the steering wheel 10 is turned in a first steering direction, to the right for example, the left rear ground engaging wheel will drive faster than the right rear ground engaging wheel thereby steering the vehicle in the first direction, or right direction. For true ZTR steering in this case, the left rear ground-engaging wheel may drive forward and the right rear ground-engaging wheel may drive backward. When the vehicle is driven in the reverse, or second, direction, and with the steering wheel still turned in the first steering direction, which may be to the right, the left rear ground-engaging wheel may still drive faster than the right rear ground engaging wheel accept in the opposite direction causing the vehicle to steer properly in the forward and reverse direction. By steering properly in the forward and reverse directions it is meant that the steering of the ZTR vehicle responds similarly to a vehicle having drive wheels driven at a constant rate and wherein steering wheels are pivoted with respect to the frame of the vehicle.

With continued reference to FIGS. 2 and 3, the ZTR control linkage 31 may include a rod member 38 that is rotatably attached with respect to the frame 3. The rod member 38 has a first end 39 that is fixedly attached to a speed control member 11 or pedal member 41. The pedal member 41 is therefore also pivotally attached with respect to the frame 3, which is allowed to rotate in first and second directions. It is noted the pedal member 41 may be biased via a spring or other mechanism toward a neutral or non-driving position. The first direction may represent the forward direction of travel, which when member 11 is depressed will drive the vehicle forward. With the steering wheel not steered in a first or second direction, the drive units will drive equally at the same magnitude propelling the vehicle straight forward, not steering in either direction. Likewise, the second or reverse direction functions in a similar manner. In this way, depressing the pedal member 41 in a first direction rotates the rod member 38 in a first rotational direction 42 and likewise depressing the pedal member 41 in a second direction rotates the rod member 38 in a second rotational direction 43. There is also fixedly attached to the rod member 38 two control members 34, 35, which may be two speed input members 54, 55. However, in that the two members 34, 35 rotate together in unison, the two control members 34, 35 may function as a single speed-control member 34*a*. In this way, actuation of the pedal member 41 applies rotational force equally to both of the speed input members 54, 55. The speed input members 54, 55 will be discussed in greater detail in a subsequent paragraph. The ZTR control assembly 31 may also include two second members 44, 45, which may be steering input members 64, 65. The steering members 64, 65, at a first end 64*a*, 65*a* thereof, are received onto the rod member 38 in such a manner that the steering members 64, 65 may rotate with respect to the rod member 38. In this way, depressing the pedal member 41 in either direction does not affect the rotational movement or adjustment of the steering members 64, 65. Additionally, there may be two generally tubular sleeve members 51, 52 that are rotationally attached with respect to second ends 64*b*, 65*b* of the steering members 64, 65. The sleeve members 51, 52 are also respectively received onto the input shafts 26, 28 and may slide longitudinally thereon for use in providing input steering forces as will be discussed in a subsequent paragraph. As the steering members 64, 65 are rotated, the sleeve members 64, 65 may independently rotate with respect to the first ends 64*a*, 65*a* of the steering members 64, 65 and will further be longitudinally adjusted along the input shafts 26, 28.

Figure 4:
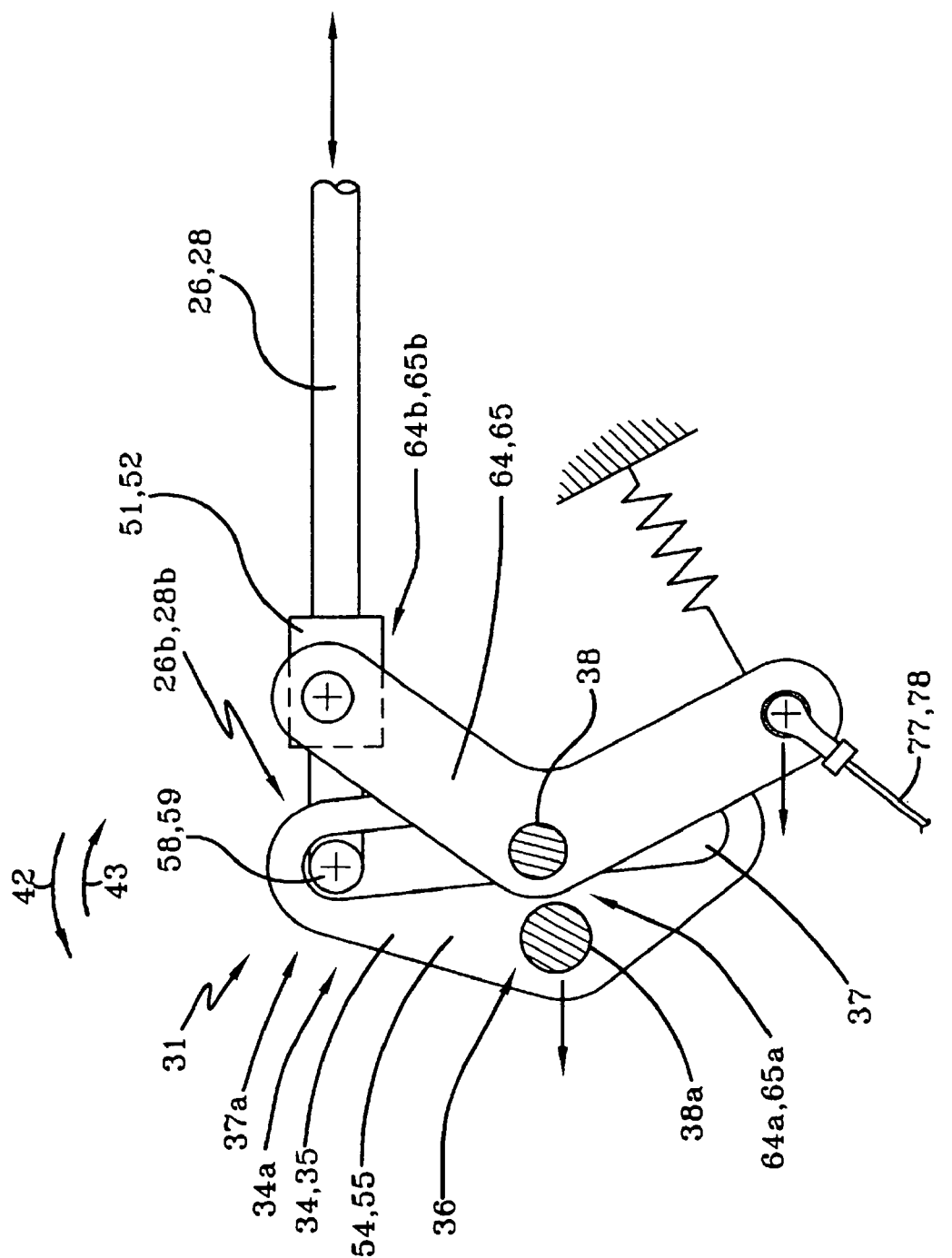
FIG. 4 is a close up side view of the mechanical ZTR control linkage.

With reference now to FIGS. 3 and 4, FIG. 4 depicts a close up side view of only one section of the mechanical ZTR control linkage 31 for the purpose of clarity. It is understood that the opposite side of the linkage functions in a similar manner. The rod member 38 has a U-shaped portion 38*a* whereon the speed input members 54, 55 are fixedly attached. The speed input members 54, 55 may have an aperture 36 fashioned therein that receives the rod member 38. Subsequently, the speed input members 54, 55 may be welded to the rod member 38*a*. However, any configuration of the speed input member and any means of fixedly securing the speed input members 54, 55 to the rod member 38a may be chosen with sound engineering judgment. It is noted that FIG. 4 shows the cross section of the U-shaped portion 38a of the rod member 38 disposed in the plane of the speed input members 54, 55. Likewise, FIG. 4 shows the cross section of the rod member 38 in the plane of the steering members 64, 65 at the first end 64a, 65a of the steering members 64, 65. Focusing on the input shafts 26, 28, the second ends 26b, 28b are fashioned to form slot pins 58, 59. The slot pins 58, 59 are curved so as to engage a slot 37 formed in the speed input members 54, 55 as will be discussed in the following paragraphs. In this manner, the slot pins 58, 59 are fashioned to sliding engage the speed input members 54, 55 along the length of the slot 37 formed in the speed input members 54, 55. When the speed input 54, 55 are rotated in a first direction, the input shafts 26, 28 may be pulled or shifted in a first direction rotating the pintle links and engaging the driving units.

Figure 5:
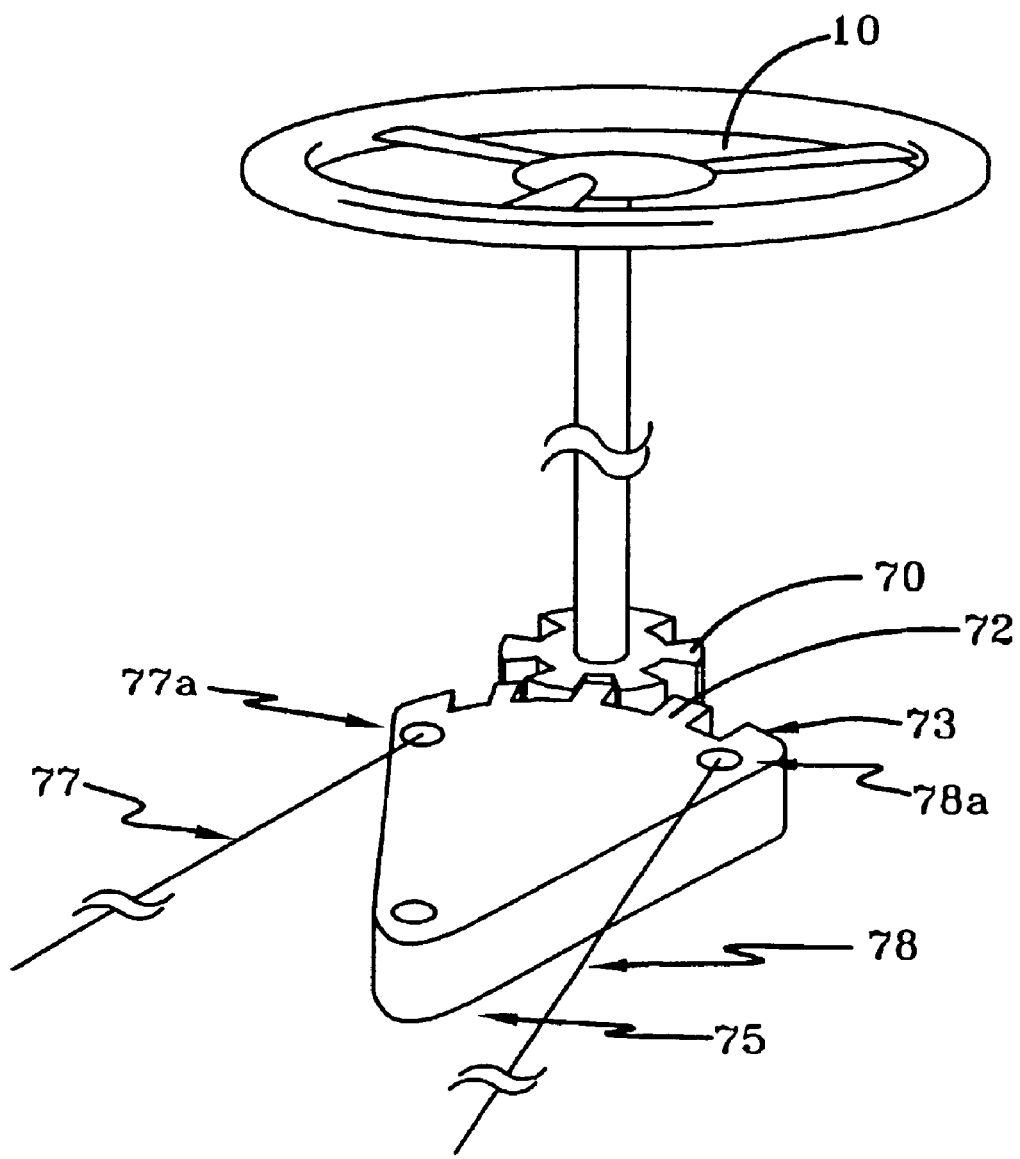
FIG. 5 is a perspective view of the steering wheel and steering mechanism.

With continued reference to FIG. 4 and now to FIG. 5, the steering wheel 10 may be fixedly connected to a pinion gear 70 that meshingly engages a steering disk 72 having coordinating gear teeth 73. At a distal end 75 of the steering disk 72, the steering disk 72 is pivotally attached with respect to the frame 3. In this manner, turning the steering wheel 10 rotates the pinion gear 70 that in turn rotates the steering disk 72. In that the operation of steering wheels and steering mechanisms are well known, no further explanation will be offered at this point. First and second tension cables 77, 78 are further included and fixedly attach at first ends 77a, 78a to the steering disk 72, as clearly shown in Figures, and at second ends 77b, 78b to the steering members 64, 65. It is noted that the tension cables 77, 78 translate tension force only. In this way, rotating the steering wheel 10 applies force to only one of the tension cables 77, 78 at a time. In other words, rotating the steering wheel 10 in a first direction applies tension force to tension cable 77, while allowing tension cable 78 to be slack or be in a state having no tension applied to the cable. Consequently, rotating the steering wheel 10 in the second direction applies tension force to cable 78, while allowing cable 77 to be slack. In this manner, rotating the steering wheel 10 applies tension force to one of the steering member 64, 65. It is noted that the steering members 64, 65 may be biased toward a default position by any means chosen with sound engineering judgment. In this way, the steering member 64, 65 may be preloaded with predetermined amount of force, taking up slack in the cables 77, 78 during rotation of the steering wheel 10.

Figure 6A:
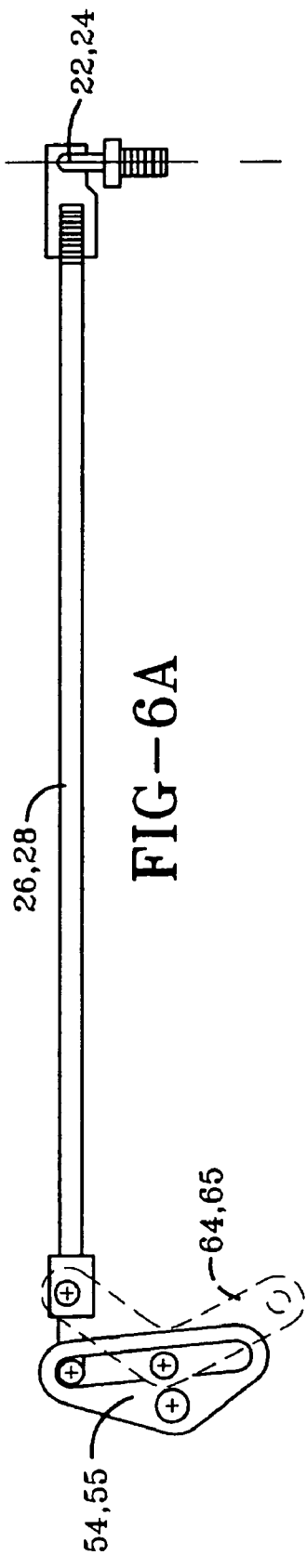
FIG. 6a is a schematic side view of the ZTR control assembly with no steering input and no speed input.
Figure 6B:
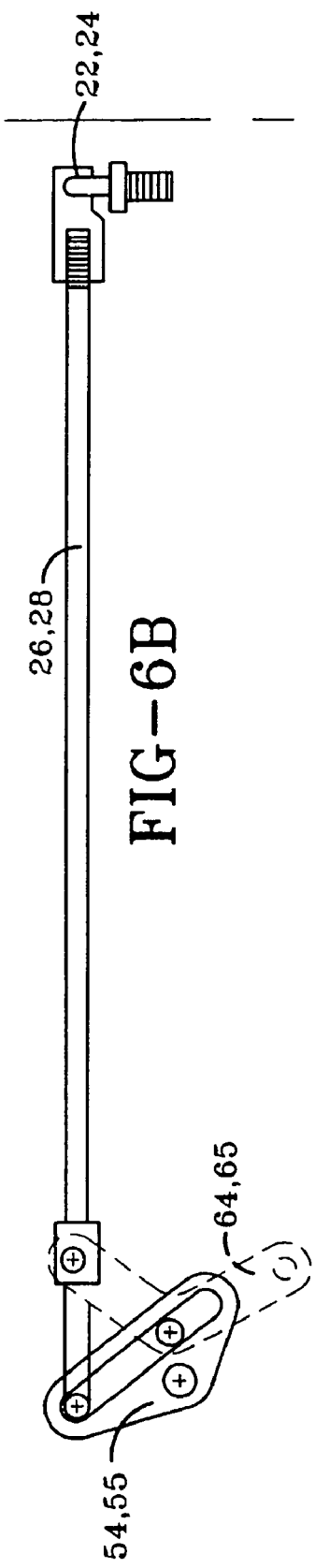
FIG. 6b is a schematic side view of the ZTR control assembly with no steering input and speed input driving the vehicle in a forward direction.
Figure 6C:
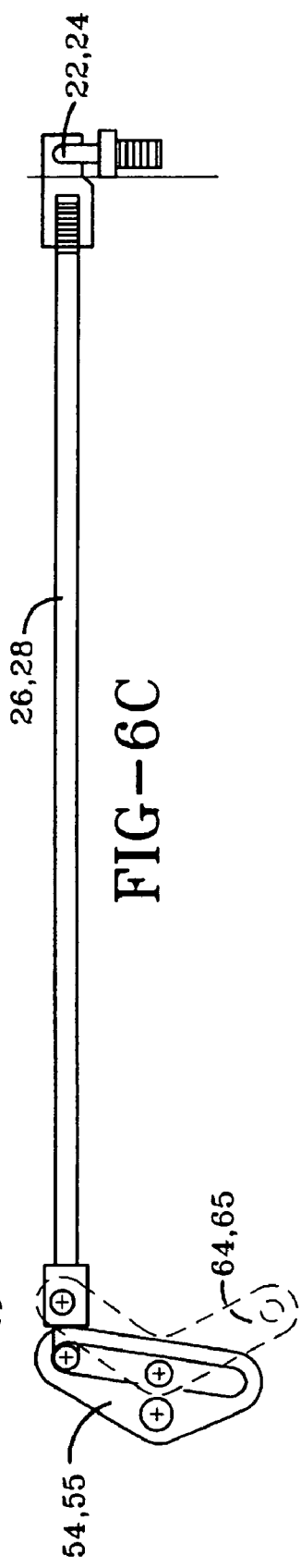
FIG. 6c is a schematic side view of the ZTR control assembly with no steering input and speed input driving the vehicle in a reverse direction.

With continued reference to FIGS. 2 through 5 and now to FIGS. 6 and 7, the operation of the present invention will now be discussed. FIGS. 6 and 7 schematically show the various positions of the steering members 64, 65, the speed input members 54, 55 and the input shafts 26, 28 as related to steering and accelerating the vehicle 1. Specifically, FIG. 6 refers to a first mode of operation where the vehicle 1 is driving straight, that is to say that the vehicle 1 is being driven forward without steering input. In this mode, the driver depresses the pedal member 41 (Reference FIG. 3) in a first direction 42, which causes rotation of the speed input members 54, 55. This is clearly depicted in FIG. 6b. As previously described, this action results in the pintle links 22, 24 being shifted, which drives the vehicle 1 forward. It is noted that the steering members 64, 65 remain in a constant default position, which forces the slot pins 58, 59 toward one end 37a of the slot 37. In a similar manner, depressing the pedal member 41 in the second direction 43 drives the vehicle 1 in reverse. Referring now to FIG. 7, FIG. 7a shows the steering wheel 10 rotated in a first direction to a maximum position. In this manner, the tension cable 77 applies force to rotate steering member 64, whereby the bias force holding the steering member 64 is overcome. This shifts slot pin 58 to a distal end of slot 37. In this manner, depressing the pedal member 41 in a first direction causes rotation of pintle link 22 in a reverse direction than when slot pin 58 was biased in the default position. In other words, depressing the pedal member 41 to drive the vehicle forward, with the steering wheel 10 fully turned in the first direction, causes pintle link 22 to drive that respective wheel in reverse. Noting that the opposing wheel is driven forward, this results in a Zero Radius turn. Thus, it can be seen that ZTR steering in forward and reverse is accomplished. It is noted that the vehicle 1 may include front steerable wheels 4, 5 that are rotated proportionately to the turning radius of the vehicle. Any manner of steering the front wheels 4, 5 may be chosen with sound engineering judgment. In this way, the front steerable wheels 4, 5 may be rotated to be substantially tangent to an arc defined at one point by the radius of turning and by the other point at the center of each wheel 4, 5.

Figure 8:
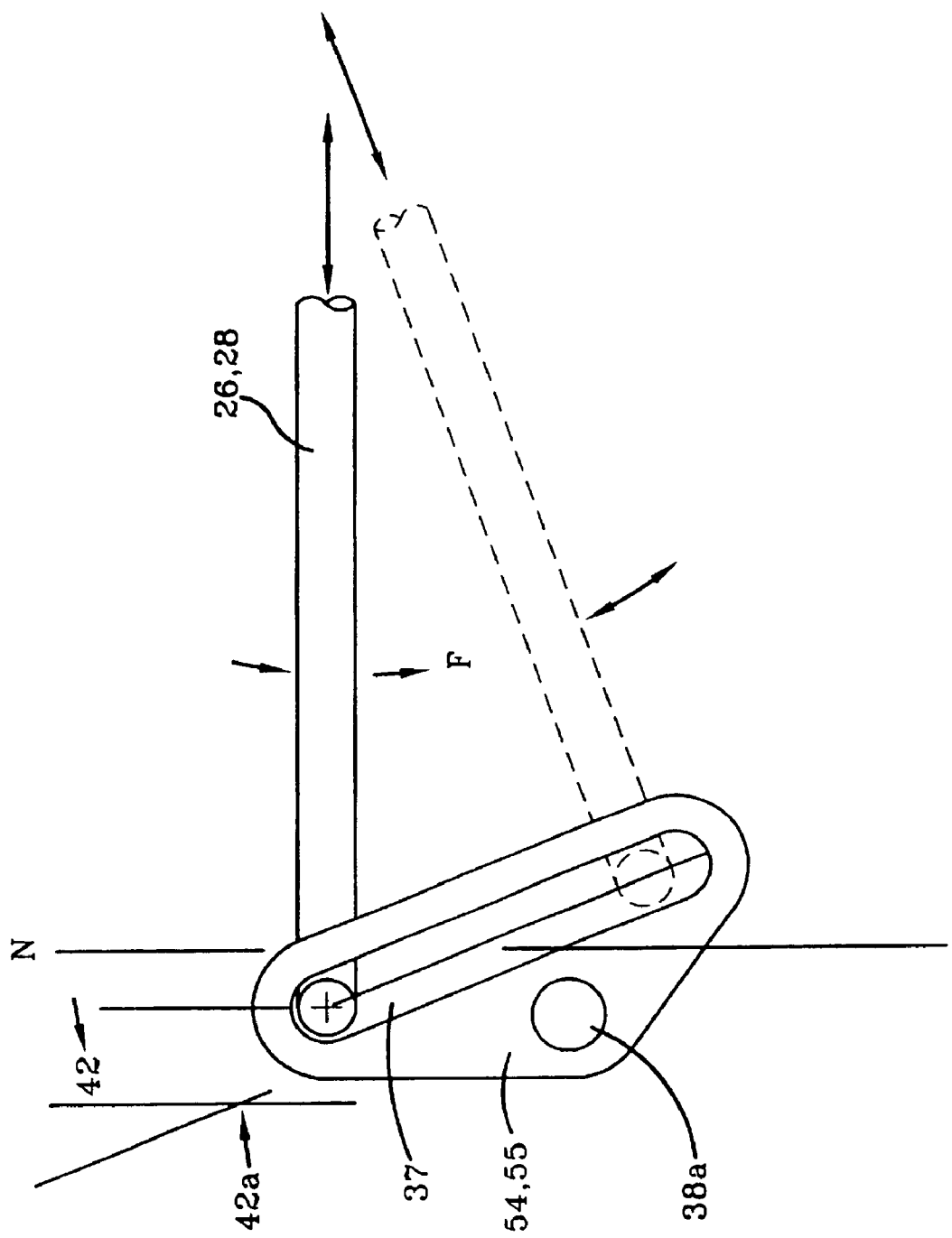
FIG. 8 is schematic representation of the drive control members and the speed input members engaged in the forward direction.
Figure 9:
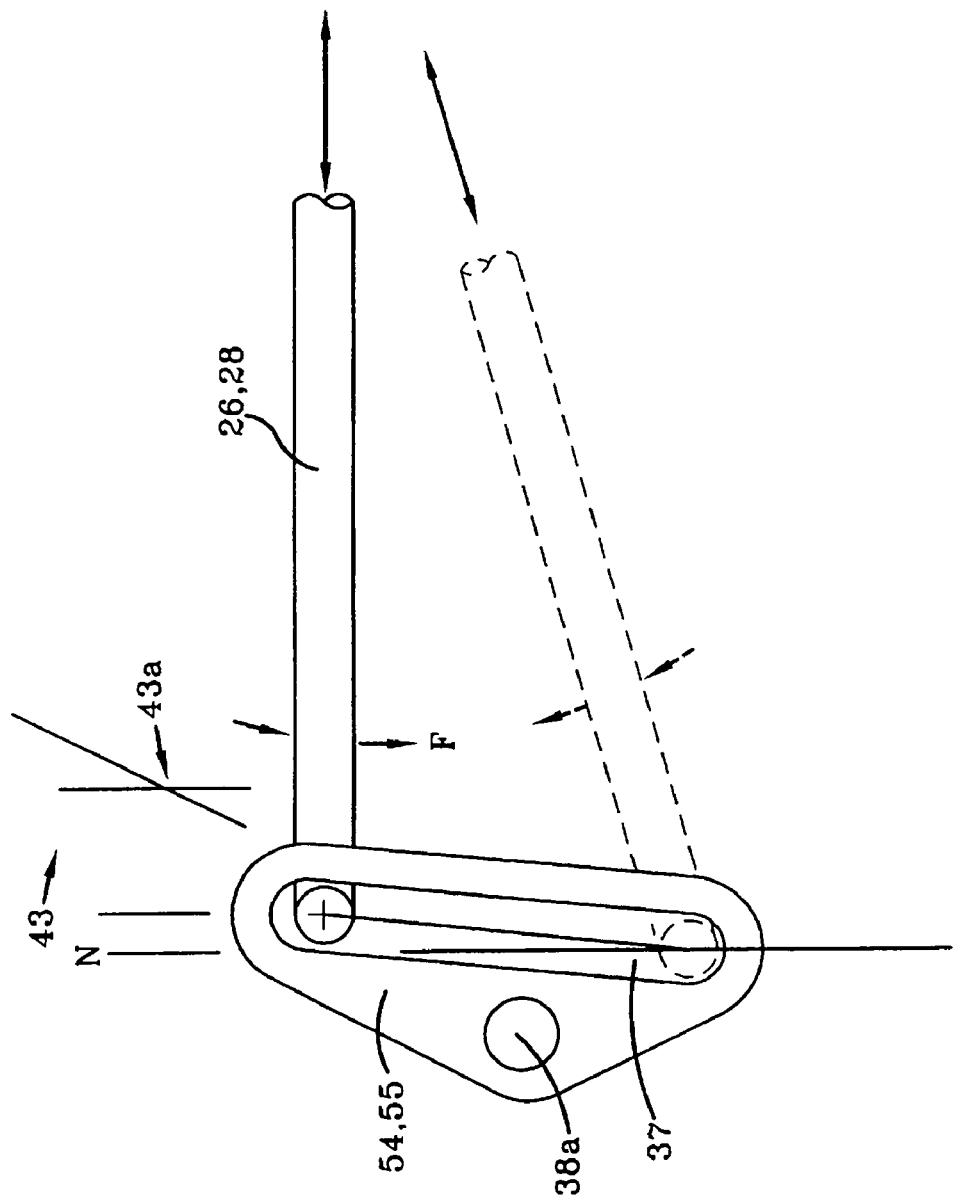
FIG. 9 is schematic representation of the drive control members and the speed input members engaged in the reverse direction.

With reference again to FIG. 4 and now to FIGS. 8 and 9, the shifting of the input shafts 26, 28 will now be discussed. As previously mentioned, the input shafts 26, 28 may be rigid rods connected at respective first ends 26a, 28a to the pintle links 22, 24, reference FIG. 2. The pintle links 22, 24, as well known in the art, actuate the drive units, or stroke the hydrostatic drive, in first and second directions and at selectively varying magnitudes of speed. The distal ends of the input shafts 26, 28, or drive control members, may be communicated to the speed input members 54, 55 and the steering members 64, 65 as previously described. FIG. 8 shows only one of the speed input members 54, 55 and one drive control member or input shaft 26, 28 for clarity. The drive control member 26, 28 may have a neutral or non-engaging position N wherein the respective locomotive drive 16, 18 is substantially not engaged to drive in either the forward or reverse direction. The drive control member 26, 28 is shown received in the slot 37 of the speed control member 54, 55 at a top position 37a. This may be the default or biased position. When the pedal member 41 is rotated in a first direction 42, the drive control member 26, 28 is shifted in a first direction to engage the respective locomotive drive unit 16, 18 to drive in a first direction and speed. Similarly, FIG. 9 shows the same shifted in a second direction. The first direction 42 may coordinate with a forward direction of travel and second direction 43 may coordinate with the reverse direction of travel. However, any configuration of engaging the drive units 16, 18 and shifting the control members 26, 28 may be chosen with sound engineering judgment.

Figure 10:
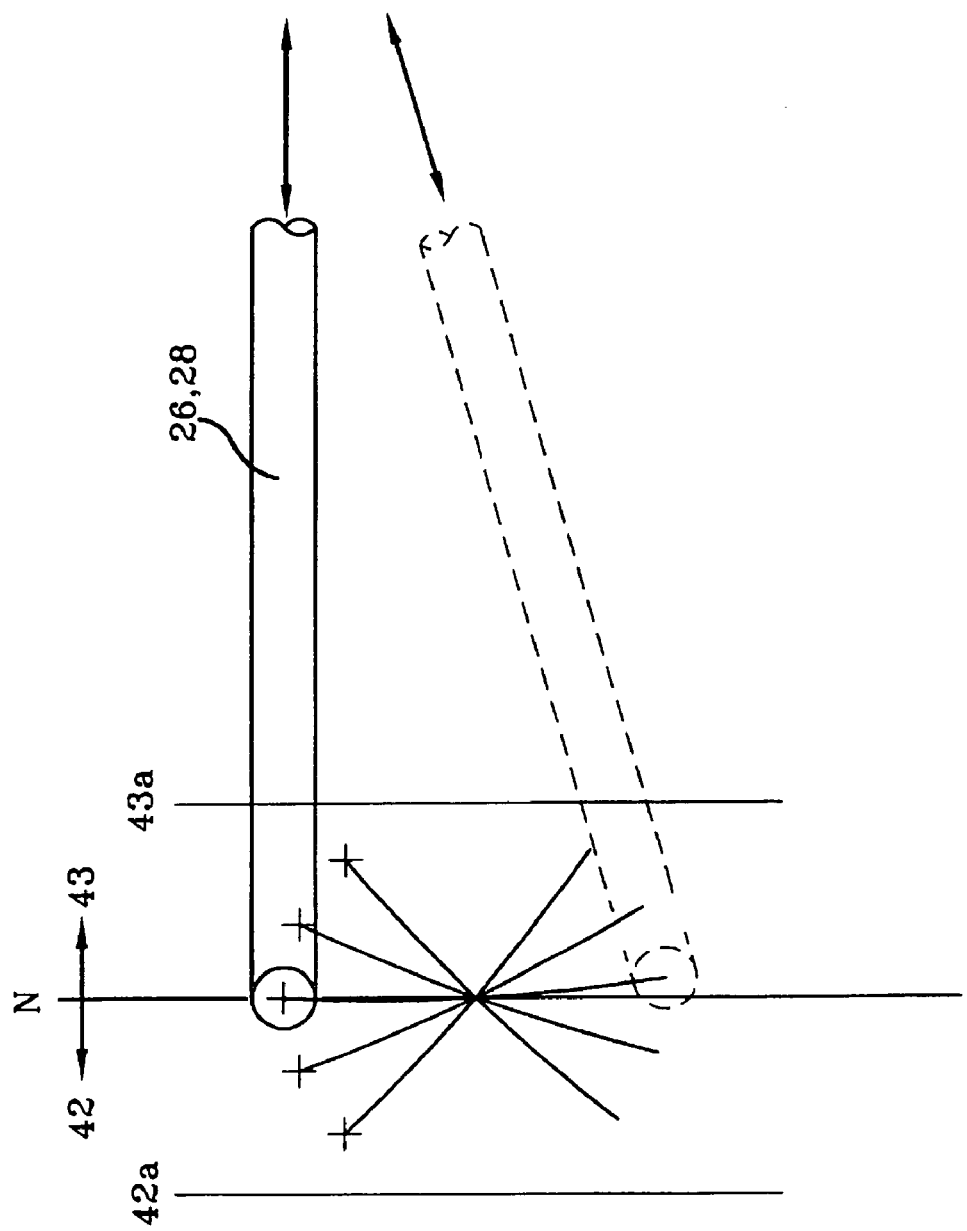
FIG. 10 is schematic representation of the drive control members and a series of trajectories for the control members.

It can be observed from FIGS. 8 and 9, that the drive control members 26, 28 may be adjusted through the slot 37 applying a force F to overcome the bias force, which may be a spring force not shown, operatively connected in a manner well known in the art. In the preferred embodiment, the force F may be applied via the slidably engaging steering members 64, 65 actuated by selectively steering the steering wheel 10, which will be discussed further in a subsequent paragraph. Continuing, the drive control members 26, 28 may selectively pivot through the slot 37 to cross from a first direction 42 position through the neutral position N to a second direction position 43. The speed input members 54, 55 may be rotated, in an analog fashion, at any point from a first maximum position 42a to a second maximum position 43a establishing a series or a plurality of trajectories through which the drive control members 26, 28 may be selectively maneuvered. FIG. 10 shows one such series of trajectories. In this manner, the drive control members 26, 28 may be selectively shifted from a top or upper slot position to a lower or bottom slot position.

However, it is expressly noted that pivoting from the top to the bottom position may shift the respective drive control member 26, 28 from the first direction 42 to the second 43 or from the second direction 43 to the first 42 depending upon the position of the speed control members 54, 55. It is also noted that the top and bottom positions of slot 37 may be selectively positioned at various points between the first and second maximum positions 42a, 43a. In this way, as the speed input members 54, 55 shift both of the drive control members 26, 28 in unison and in that the steering members 64, 65 can be rotated independently or asynchronously, it can be seen that the shifting of the drive control members 26, 28 may resultantly actuate the locomotive drives 16, 18 to steer and propel the ZTR vehicle 1 in a manner consistent with proper steering in the forward and reverse directions.

Figure 11B:
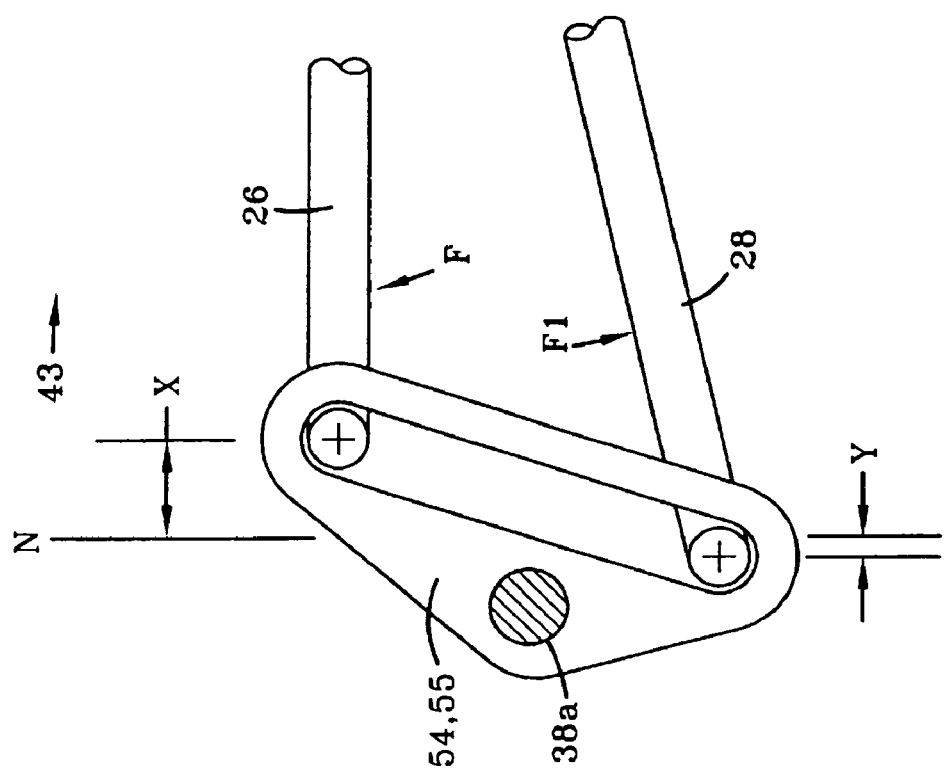
FIG. 11b is schematic representation of the drive control members and the speed input members engaged in the forward direction.
Figure 11A:
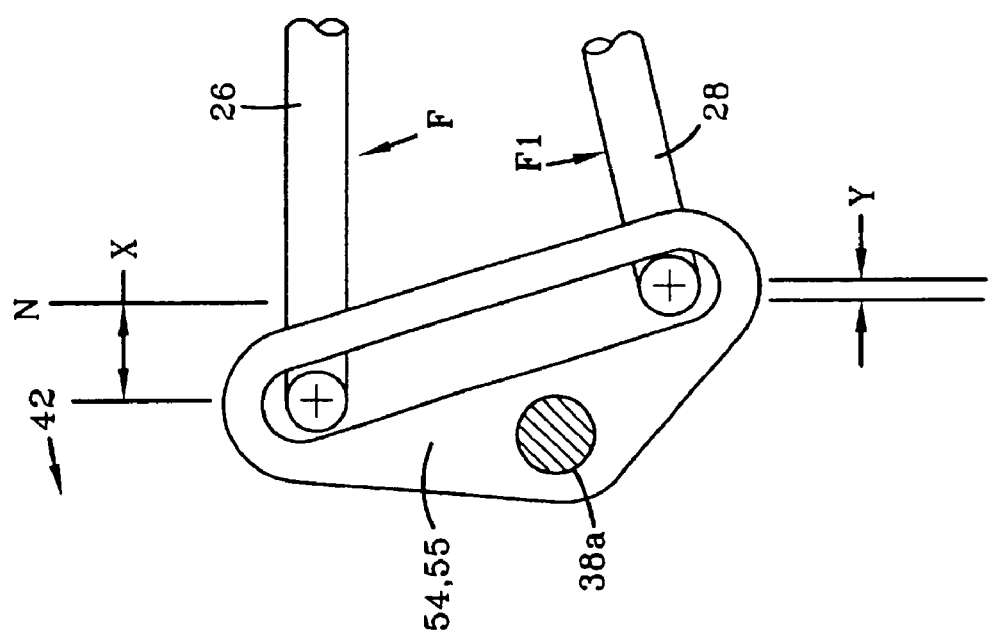
FIG. 11a is schematic representation of the drive control members and the speed input members engaged in the forward direction.

With reference now to FIGS. 11a and 11b, the drive control members 26, 28 are shown steered in a first direction and driven in a first direction 42. For purposes of clarity, the steering members 64, 65 are replaced with force vectors F1 to show the operation of the present invention more clearly. It should be noted that the present configuration is representative of FIG. 7c. In this case, the tension cable 77, which may also be rigid rod members configured to translate tension force only, pull on the first rotatable steering members 64, overcoming bias forces, thereby rotating the steering member 64 in a first direction, which may be clockwise. Since the opposing cable 78 is not under tension, no steering force is supplied to the steering member 65, although the steering member 65 may include a force means to bias the steering member 65 substantially in a second direction, which may be a counter clockwise direction. In this manner, the drive control members 26, 28 may be shifted asynchronously. FIG. 11a shows the drive control member 26 shifted a distance X in the first direction and shows drive control member 28 shifted in the second direction a distance Y. It is noted that the slot 37 may be slightly curved to compensate for differences in actuating the locomotive drives 16, 18 due to hysteresis and other non-linear factors. However, any configuration of slot 37 fashioned in the speed control members 54, 55 may be chosen with sound engineering judgment. Distance X may be greater than distance Y, representing that drive 16 has a greater magnitude of speed than drive 18. In that the directions are opposite, the first wheel 6 may be rotating forward at a speed proportionate to distance X and the second wheel 7 may be rotating in reverse at a speed proportionate to distance Y, thus resulting in a turning radius that resides within the wheelbase or at the center of the wheelbase. When the pedal member 41 is pivoted in the second direction 43 and with the steering in the same position, that is to say that forces F and F1 remain constant, the magnitude of the ratio of X/Y remains the same although the direction of each drive is reversed. This results in proper steering in the forward and reverse directions as previously mentioned.

While specific embodiments of the invention have been described and illustrated, it is to be understood that these embodiments are provided by way of example only and that the invention is not to be construed as being limited thereto but only by proper scope of the following claims.

I claim:

1. A vehicle capable of making a small radius turn, comprising:
a frame;
a left drive wheel and a right drive wheel, both coupled to the frame;
two independent left and right drive units, the left drive unit coupled to the left drive wheel via an axle and the right drive unit coupled to the right drive wheel via another axle;
a steering device coupled to the frame;
a speed control member coupled to the frame; and
a mechanical control assembly coupled to the left and right drive units that is configured to actuate the left and right drive units based on a steering input received from the steering device and a speed input received from the speed control member;
the mechanical control assembly being configured such that if the speed control member is shifted from (a) a forward position in which the left drive wheel is rotating in a forward direction at a first forward speed and the right drive wheel is rotating in a forward direction at a second forward speed that is less than the first forward speed as a result of the steering device being in a first right turn position to (b) a reverse position while the first right turn position of the steering device is maintained, then the left drive wheel will rotate in a reverse direction at a first reverse speed and the right drive wheel will rotate in a reverse direction at a second reverse speed that is less than the first reverse speed.

2. The vehicle of claim 1, where the steering device is a steering wheel.

3. The vehicle of claim 2, where each drive unit is coupled to the mechanical control assembly through a drive control member.

4. The vehicle of claim 3, where the mechanical control assembly is capable of moving the drive control members in unison.

5. The vehicle of claim 3, where the mechanical control assembly is capable of moving one drive control member but not the other in response to a single steering input received from the steering wheel.

6. The vehicle of claim 3, where the mechanical control assembly is configured such that when the speed control member is shifted from a first maximum position to a second maximum position and the steering wheel is steered in a first direction, the ratio of the distance that one drive control member is shifted with respect to a neutral position to the distance that the other drive control member is shifted with respect to the neutral position remains substantially constant.

7. The vehicle of claim 2, where the mechanical control assembly is capable of actuating the two drive units such that the drive wheels rotate in opposite directions.

8. The vehicle of claim 2, where the drive units are hydrostatic drive units.

9. A vehicle capable of making a small radius turn, comprising:
a frame;
a left drive wheel and a right drive wheel, both coupled to the frame;
two independent left and right drive units, the left drive unit coupled to the left drive wheel via an axle and the right drive unit coupled to the right drive wheel via another axle;
a steering device coupled to the frame;
a speed control member coupled to the frame; and
a mechanical control assembly coupled to the left and right drive units that is configured to actuate the left and right drive units based on a steering input received from the steering device and a speed input received from the speed control member;
the mechanical control assembly being configured such that if the speed control member is shifted from (a) a forward position in which the left drive wheel is rotating in a forward direction at a first forward speed and the right drive wheel is rotating in a forward direction at a second forward speed that is less than the first forward speed as a result of the steering device being in a first right turn position to (b) a reverse position while the first right turn position of the steering device is maintained, then the left drive wheel will rotate in a reverse direction at a first reverse speed and the right drive wheel will rotate in a reverse direction at a second reverse speed that is less than the first reverse speed;

the mechanical control assembly also being configured to cause the vehicle to execute a zero-radius turn when the speed control member is in a maximum forward position and the steering device is in a maximum turn position.

10. The vehicle of claim 9, where the steering device is a steering wheel.

11. The vehicle of claim 10, where each drive unit is coupled to the mechanical control assembly through a drive control member.

12. The vehicle of claim 11, where the mechanical control assembly is capable of moving the drive control members in unison.

13. The vehicle of claim 11, where the mechanical control assembly is capable of moving one drive control member but not the other in response to a single steering input received from the steering wheel.

14. The vehicle of claim 11, where the mechanical control assembly is configured such that when the speed control member is shifted from a first maximum position to a second maximum position and the steering wheel is steered in a first direction, the ratio of the distance that one drive control member is shifted with respect to a neutral position to the distance that the other drive control member is shifted with respect to the neutral position remains substantially constant.

15. The vehicle of claim 10, where the mechanical control assembly is capable of actuating the two drive units such that the drive wheels rotate in opposite directions.

16. The vehicle of claim 10, where the drive units are hydrostatic drive units.

\* \* \* \* \*